United States Patent Office 3,256,348
Patented June 14, 1966

3,256,348
PROCESS FOR PREPARING PHENOL
Irwin Schlossman, Whitestone, N.Y., assignor to Halcon International, Inc., a corporation of Delaware
No Drawing. Filed July 6, 1960, Ser. No. 41,030
6 Claims. (Cl. 260—621)

This invention relates to a process for preparing phenol, and more particularly to a process for converting an oxygenated cyclohexane cut or fraction to pure phenol by dehydrogenation and distillation.

Phenol is a very important industrial chemical. Crude phenol may be prepared by dehydrogenating cyclohexanone or cyclohexanol. However, difficulties are encountered in recovering pure phenol from the resulting product, especially where the dehydrogenation charge contains impurities which boil at about the same temperature as phenol. The art is confronted by the problem of obtaining pure phenol in an economical and convenient manner from such oxygenated cyclohexane material.

The discoveries associated with the invention relating to solution of the above problems and the objects achieved in accordance with the invention as described herein include the provision of:

A process for preparing phenol from an oxygenated cyclohexane fraction containing cyclohexanone and/or cyclohexanol and a (non-phenolic) impurity which boils at about the same temperature as phenol which process comprises vaporizing this fraction and diluting it with hydrogen in an amount in the range of 1 to 15 mols of hydrogen per mol of total cyclohexanone and cyclohexanol therein, and contacting the resulting mixture with a platinum-on-carbon catalyst at a temperature in the range of 250° to 425° C. at a liquid hourly space velocity in the range of 0.3 to 2.5 per hour, and recovering phenol product as distillate free from the stated impurity;

Such a process wherein the fraction boils in the range of 54° to 94° C. at 23 mm. Hg;

Such a process wherein reaction temperature is 380° C.;

Such a process wherein the liquid hourly space velocity is 0.7;

Such a process wherein phenol having a freezing point of at least 40.0° C. is recovered by fractionating the reaction product under reduced pressure conditions such that the highest temperature is not over 150° C.; and other objects which will be apparent as details or embodiments of the invention are set forth hereinafter.

In order to indicate still more fully the nature of the present invention, the following example of a typical procedure is set forth, in which parts and percent mean part and percent by weight, respectively, it being understood that this example is presented as illustrative only and is not intended to limit the scope of the invention.

*Example I*

Cyclohexane is subjected to an air oxidation at 150° C. and super atmospheric pressure in the presence of a cobalt naphthenate catalyst so as to give a reaction mixture in which about 10% of the cyclohexane is oxidized. After removal of unreacted cyclohexane, the reaction mixture is vacuum distilled and a cut is obtained as a charge stock for dehydrogenation. This cut contains cyclohexanone and cyclohexanol and non-phenolic material which boils within about 6° C. of the boiling point of phenol. Dehydrogenation is accomplished using a platinum-on-carbon catalyst to produce a crude phenol. Pure phenol is recovered therefrom by distillation; e.g. free from the stated impurity.

The distillation apparatus used in this example is a one-inch diameter, vacuum jacketed, 12 actual plate glass column (Oldershaw) equipped with a time switch operated magnetic reflux splitter condensing head of conventional design, a jacketed distillate receiver, a batch pot and heating mantle, and a vacuum pump and mercury U-tube manometer.

At the start of the oxygenated cyclohexane distillation, the pressure at the top of the column is reduced to about 23 mm. Hg and the pot is heated to 73° C. (the head is at 60° C.) and the reflux ratio is 2 to 1. These conditions are changed in small increments until the pressure is 23 mm. Hg absolute and the reflux ratio is 1 to 10 (reflux to product). A preliminary or lower boiling fraction is removed at a head temperature from 43° to just up to 54° C. Then a heart-cut or main fraction is recovered at a head temperature of 54 to 94° C. This 93.5% cyclohexanone plus cyclohexanol, also contains non-phenolic material which boils at as well as within about 6° C. of the boiling point of phenol. Finally, a tail cut or fraction is removed at temperatures in the range of 23° to 154° C. at a pressure in the range of 2 to 10 mm. Hg, and corresponding pot temperatures.

The dehydrogenation step is carried out with the feedstock in the vapor phase, using a dehydrogenation catalyst such as platinum (2%) on activated carbon. The cyclohexanol and cyclohexanone heart-cut feedback is diluted with added hydrogen (4 to 8 mols of hydrogen per mol of total cyclohexanone and cyclohexanol present). The mixture is contacted with the catalyst at 380° C. to 385° C. and a liquid hourly space velocity of 0.7 per hour. This produces 88.1 parts of product per 100 parts of feedstock consumed and this product analyzes 90.8% phenol.

There is no decrease in catalyst activity even after extended operation.

Pure phenol (exceeding the USP freeze point specification) is obtained from the above mentioned product by distillation in a 30 plate column of the above described type further equipped with a condensing head having a decanter tube (Dean-Stark) using a reflux ratio of 33 to 1, a pot temperature of about 113° C., and a head temperature of 99° C. The yields correspond to the above mentioned analyses.

These results are most surprising when it is realized that the charge stock fraction prepared as described contains non-phenolic substances which are neither cyclohexanol nor cyclohexanone and which boil within the temperature range over which pure phenol is separated in a distillation. It is evident that the process of the present invention not only successfully dehydrogenates impure cyclohexanol-cyclohexanone mixtures but at the same time so alters impurities originally inseparable from the produced phenol as to render them readily removable from that product.

These improvements or advantages are also achieved with wider or narrower boiling range fractions containing the stated impurity along with cyclohexanone or cyclohexanol or both.

Comparable results to the foregoing are obtained by various modificatons thereof including the following. As indicated, the dehydrogenation step is carried out in the presence of (added) hydrogen, with the feedstock in the vapor phase, using a dehydrogenation catalyst such as platinum on carbon. The mixture of hydrogen, cyclohexanol and cyclohexanone is contacted with the dehydrogenation catalyst such as 0.5 to 5% platinum on carbon or equivalent material, in a zone maintained at a temperature in the range of from about broadly 250° to 425° C. and desirably 325° to 400° C. and preferably 375° to 385° C., at a liquid hourly space velocity of broadly from about 0.3 to 2.5, desirably 0.6 to 1 and preferably 0.7 to 0.8. The mol ratio of hydrogen is in the range of 1 to 15, and desirably 4 to 8 mols of hydrogen per mol of total cyclohexanol and cyclohexanone. Under these conditions there is little or no production of either benzene or cyclohexane.

The oxidation step is carried out in liquid phase and in the range of broadly from about 125 to 180° C., desirably 125° to 150° C. and preferably 130° C. The pressure should be sufficient to maintain a liquid phase and so that the partial pressure of the oxygen is at least one-half atmosphere. Higher pressures can be used in some cases, and the partial pressure of the oxygen in the mixture can be as high as approximately 200 p.s.i.g. The rate at which air or oxygen-containing gas is fed is governed in part at least by the geometric configuration of the particular reaction zone utilized. It should, of course, not be so great as to cause flooding or undesired entrainment of the material being oxidized.

The conversion of cyclohexane can be in the range of from about broadly 3 to 16, desirably 7 to 13 and preferably about 10%. If the conversion of cyclohexane is less than approximately 3 to 5%, the step of separating the cyclohexane from the oil is uneconomical. Conversions in excess of 16% are not desired because in general as conversion increases the relative yield of cyclohexanone and cyclohexanol based on converted cyclohexane drops and the relative yield of undesirable side products increases.

The isolation of dehydrogenation stock can be carried out after stripping the unreacted cyclohexane by any convenient means.

The pressure utilized is broadly atmospheric to 100 p.s.i.g. and preferably atmospheric. The conversion of cyclohexanone and cyclohexanol to phenol is maintained in the range of from about broadly 50 to 100%, and preferably at least 75% per pass. After separation of phenol, the residue may be recycled to the dehydrogenation step.

The process of this invention is adapted for use in connection with the over-all process for the preparation of phenol from cyclohexanol or benzene, e.g., as set forth more fully in the USP application, Serial No. 24,855, of Alfred Saffer and Rex E. Lidov, entitled Chemical Process, filed on April 26, 1960 and now abandoned. For obtaining higher purity material, the phenol distillation may be carried out at reduced pressures such that 150° C. is the maximum temperature, as set forth more fully in the U.S. Patent application, Serial No. 29,816, of Jack B. Feder and Joseph L. Russell entitled Chemical Process, filed on May 18, 1960 and now abandoned; or the phenol distillation may be carried out in two steps, phenol and lower boiling materials being separated from higher boiling material in the first step, and lower boiling material being separated from the phenol in the second, as set forth more fully in the U.S. Patent application, Serial No. 35,127, of Jack B. Feder and Joseph L. Russell entitled Chemical Process, filed on June 10, 1960 now U.S. Patent 3,140,243.

Very good overall conversion of feedback to phenol is achieved, without the burden of undesirable by-products, and with marked economic advantages.

In view of the foregoing disclosures, variations and modifications thereof will be apparent to one skilled in the art, and it is intended to include within the invention all such variations and modifications except as do not come within the scope of the appended claims.

What is claimed is:
1. A process for preparing phenol from an oxygenated cyclohexane fraction which contains at least one member of the group consisting of cyclohexanone and cyclohexanol and also contains a non-phenolic impurity which boils at about the same temperature as phenol, which process comprises vaporizing said fraction and diluting it with hydrogen in an amount in the range of 1 to 15 mols of hydrogen per mol of total cyclohexanone and cyclohexanol therein, and contacting the resulting mixture which consists essentially of said fraction and hydrogen with a platinum on carbon catalyst at a temperature in the range of 250° to 425° C. at a liquid hourly space velocity in the range of 0.03 to 2.5 per hour, and recovering phenol product as a distillate free from the said impurity.

2. A process of claim 1 wherein the fraction boils in the range of 54 to 95° C., at 23 mm. Hg.

3. A process of claim 2 wherein reaction temperature is in the range of 375° to 385° C.

4. A process of claim 3 wherein the liquid hourly space velocity is 0.7.

5. A process of claim 4 wherein phenol having a freezing point of at least 40.0° C. is recovered by fractionating the reaction product under reduced pressure conditions such that the highest temperature is not over 150° C.

6. A process of claim 4 wherein the amount of hydrogen is in the range of 4 to 8 mols.

References Cited by the Examiner

UNITED STATES PATENTS

| | | | |
|---|---|---|---|
| 2,321,551 | 6/1943 | Loder | 260—621 |
| 2,503,641 | 4/1950 | Taylor et al. | 260—621 |
| 2,609,395 | 9/1952 | Dougherty et al. | 260—610 X |
| 2,825,742 | 3/1958 | Schueler et al. | 260—610 X |

LEON ZITVER, *Primary Examiner.*

CHARLES B. PARKER, *Examiner.*